United States Patent [19]

Odaohara

[11] Patent Number: 5,375,166
[45] Date of Patent: Dec. 20, 1994

[54] COMMUNICATION APPARATUS WITH CROSS-TALK PROTECTION

[75] Inventor: Shigefumi Odaohara, Yamato, Japan

[73] Assignee: International Business Machines Corporation, Armonk, N.Y.

[21] Appl. No.: 832,121

[22] Filed: Feb. 6, 1992

[30] Foreign Application Priority Data

May 17, 1991 [JP] Japan .......................... 140751

[51] Int. Cl.⁵ .......................................... H04M 11/00
[52] U.S. Cl. ............................... 379/97; 379/386; 379/88; 379/98
[58] Field of Search ............... 379/386, 283, 416, 417, 379/97, 88, 89, 102, 104, 105, 100, 98

[56] References Cited

U.S. PATENT DOCUMENTS

| | | | |
|---|---|---|---|
| 4,313,038 | 1/1982 | Nilssen et al. | 379/283 |
| 4,431,872 | 2/1984 | Edwards et al. | 379/417 |
| 4,841,561 | 6/1989 | Hill | 379/97 |
| 4,885,763 | 12/1989 | D'Brien et al. | 379/386 |
| 5,023,903 | 6/1991 | Bowen | 379/97 |
| 5,172,406 | 12/1992 | Locke | 379/386 |
| 5,187,740 | 2/1993 | Swaim et al. | 379/386 |

Primary Examiner—Curtis Kuntz
Assistant Examiner—Stella L. Woo
Attorney, Agent, or Firm—Joscelyn G. Cockburn

[57] ABSTRACT

A communication apparatus includes a Dual Tone Multi-Frequency (DTMF) noise signal detector for detecting a first DTMF noise signal caused by the apparatus and a second DTMF signal detector for detecting a DTMF signal transmitted from another apparatus. If self-induced DTMF noise is sensed, the second DTMF signal detector is disabled. As a result, the communication apparatus is able to distinguish the DTMF noise signal caused by said apparatus from the DTMF signal transmitted from another apparatus.

9 Claims, 4 Drawing Sheets

COMMUNICATION APPARATUS WITH CROSS-TALK PROTECTION

A. Industrial Field

The present invention relates to a communication apparatus over a public switched telephone network, and more particularly to a communication apparatus over the public switched telephone network such as an advanced facsimile with a Dual Tone Multi-Frequency (DTMF) signal detecting function and a voice message sending function or an advanced telephone with a telephone answering function.

B. Prior Art

Some communication apparatus over a public switched telephone network such as an advanced facsimile or a telephone with a telephone answering function provides a DTMF signal detecting function and a voice message sending function. The voice message sending function sends an instruction or a message to the outside of said apparatuses and, on the other hand, the DTMF signal detecting function detects a DTMF signal transmitted from the outside of said apparatuses. The DTMF signal is referred to as a Dual Tone Multi-Frequency signal, which is one of sixteen combinations of four frequencies from a high-frequency group and four frequencies from a low-frequency group, each of which indicates a number, a character, or a symbol. The DTMF signal is a signal issued when a push button is depressed on the telephone and may be called a push tone or a dial tone.

FIG. 4 shows an example of such a conventional communication apparatus over the public switched telephone network. In the figure, the communication apparatus over the public switched telephone network (said apparatus) 1 is connected to extended slots of a personal computer to communicate with another apparatus 2. The communication apparatus 1 is connected, through a PSTN (Public Switched Telephone Network) 3, to another apparatus 2. The communication apparatus 1 has a NCU (Network Control Unit) 5 and a hybrid circuit (two-wire/four-wire convertor) 6 to which a DTMF signal detector 7, a voice message sending unit 8, and a MODEM 9 are connected. The DTMF signal detector 7, the voice message sending unit 8, and the MODEM 9 are connected to a control unit 11 to which a memory 12 for storing the contents of communication is connected.

Before the voice of an instruction or a message reaches another apparatus 2, the apparatus 2 may start to respond with a DTMF signal. The DTMF signal from the apparatus 2 therefore must be detected while the voice is being sent to the apparatus 2. However, a voice signal issued by the apparatus 1 may flow into the DTMF signal detector 7 through the hybrid circuit 6 and contain a frequency component similar to that of the DTMF signal. Such a signal is called a DTMF noise signal. Since the DTMF signal detector 7 cannot distinguish the DTMF signal from another apparatus 2 from a DTMF noise signal caused in the apparatus 1, the apparatus 1 malfunctions in response to the DTMF noise signal. Such a phenomenon that a signal to be sent into a receiving circuit of an apparatus from which the signal is sent out may be called cross talk.

SUMMARY OF THE INVENTION

An object of the present invention is to provide a communication apparatus, suitable for use over a public switched telephone network, free from malfunction caused by a flow of a DTMF noise signal generated in said apparatus into a DTMF signal detector.

The present invention provides a DTMF noise signal detector for detecting a DTMF noise signal generated in a communication apparatus over a public switched telephone network in addition to a DTMF signal detector for detecting a DTMF signal transmitted from the outside of said apparatus to distinguish the DTMF signal from the outside of said apparatus from the DTMF noise signal generated in said apparatus and thereby accomplish said object.

DESCRIPTION OF THE PREFERRED EMBODIMENT

Figure 1:
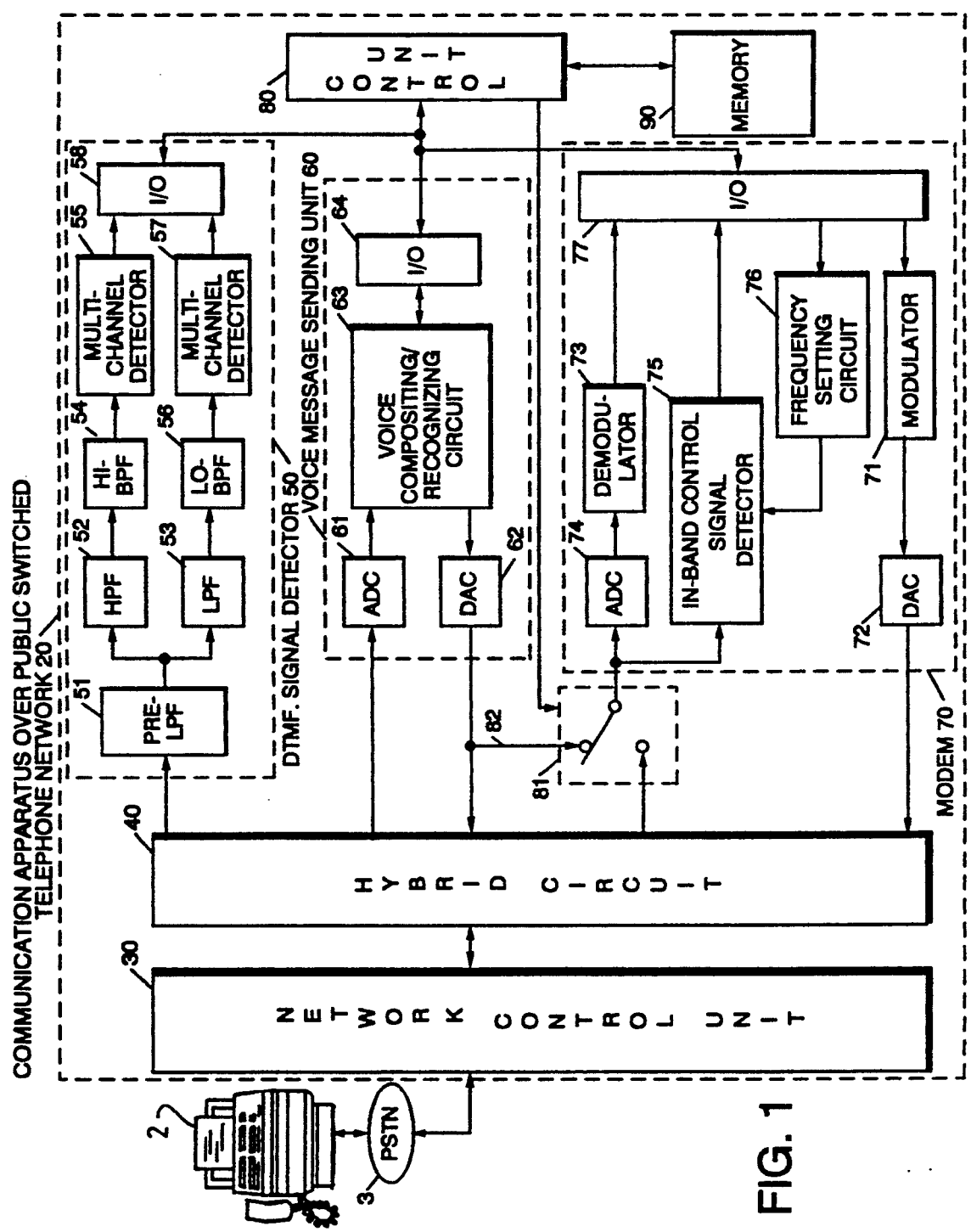
FIG. 1 is a block diagram showing the overall construction of a first embodiment of a communication apparatus over a public switched telephone network according to the present invention.

In the following, an embodiment of the present invention is described by reference to drawings. FIG. 1 shows a first embodiment of a communication apparatus for sending/receiving information over a public switched telephone network constructed in accordance with the present invention. Referring to FIG. 1, a communication apparatus over a public switched telephone network 20 includes a network control unit 30 and a hybrid circuit 40. The input/output of a four-wire circuit of the hybrid circuit 40 are connected to a DTMF signal detector 50, a voice message sending unit 60, and a MODEM 70. The DTMF signal detector 50, the voice message sending unit 60, and the MODEM 70 are connected to a control unit 80 to which a memory 90 for storing the contents of communication with another apparatus 2 is connected. The communication apparatus 20, also includes a switching circuit 81 operated by the control unit 80 to input either an analog signal from the hybrid circuit 40 or an analog signal from the voice message sending unit 60 to the MODEM 70.

The DTMF signal detector 50 detects one of sixteen combinations of DTMF signals.

The DTMF signals are divided into two frequency groups, that is, a high-frequency group including, for example, four frequencies of 1209 Hz, 1336 Hz, 1477 Hz, and 1633 Hz and a low-frequency group including, for example, four frequencies of 697 Hz, 770 Hz, 852 Hz, and 941 Hz. One of sixteen combinations of one frequency from the high-frequency group and one frequency from the low-frequency group indicates a number, a character, or a symbol. A DTMF signal including, for example, 1209 Hz and 697 Hz indicates a number of 1.

The DTMF signal detector 50 receives a DTMF signal from the hybrid circuit 40 through a spare low-pass filter 51 and cuts out-band high-frequency components of the DTMF signal as a noise. At a stage following the spare low-pass filter 51, a high-pass filter 52 and a low-pass filter 53 are connected in parallel. The high-pass filter 52 outputs only signals of frequencies belonging to the high-frequency group in DTMF signal components and, on the other hand, the low-pass filter 53 outputs only signals of frequencies belonging to the low-frequency group. At a stage following the high-pass filter 52, a multi-channel band pass filter 54, which outputs only four frequency components in the above high-frequency group, is provided. At a stage following the band pass filter 54, a multi-channel detector 55 is provided to detect that any of four frequency components in the high-frequency group is being inputted to the DTMF signal detector 50. At a stage following the low-pass filter 53, a multi-channel band pass filter 56 is provided to output only four frequency components belonging to the above low-frequency group. At a stage following the band pass filter 56, a multi-channel detector 57 is provided to detect that any of four frequency components belonging to the low-frequency group is being inputted to the DTMF signal detector 50. Combinations of frequencies thus determined are sent, through a data input/output buffer 58, to the control unit 80.

The voice message sending unit 60 includes an analog-to-digital converter (ADC) 61, which converts an analog signal received from the hybrid circuit 40 into a digital signal and a digital-to-analog converter (DAC) 62, which converts a digital signal into an analog signal to send the analog signal to the hybrid circuit 40. Both the ADC 61 and the DAC 62 are connected to a voice compositing/recognizing circuit (voice analyzing circuit) 63 to which a data input/output buffer 64 is connected. A voice signal from another apparatus 2 is converted into a digital signal by the ADC 61, the contents of the voice signal are recognized by the voice compositing/recognizing circuit 63, and then its contents is stored in the memory 90 for whenever they are needed. A digital signal composited by the voice compositing/recognizing circuit 63 is transmitted as a voice signal, through the DAC 62, to the another apparatus 2. A DTMF noise signal has its origin in the voice signal.

An output of the DAC 62 is connected not only to an input of a four-wire circuit of the hybrid circuit 40, but also to the MODEM 70 through a path 82 for detecting a DTMF noise signal and the switching circuit 81. An input of the MODEM 70 is connected, through the switching circuit 81, also to the hybrid circuit 40. As switching operation in the switching circuit 81 is performed based on an instruction from the control unit 80 such that if the detection of a DTMF noise signal from the voice compositing/recognizing circuit 60 is tried, output from the voice compositing/recognizing circuit 60 is inputted, through the path 82, to the MODEM 70 and otherwise, an analog signal from the hybrid circuit 40 is inputted to the MODEM 70.

The MODEM 70 includes a modulator 71 and a digital-to-analog converter (DAC) 72 for modulating digital data to be transmitted to obtain an AC signal within an analog transmission band, and a demodulator 73 and an analog-to-digital converter (ADC) 74 for demodulating an AC signal from another apparatus 2 within the analog transmission band to obtain a digital data. The MODEM 70, in addition to the above, includes an in-band control signal detector 75 for detecting an in-band control signal. The in-band control signal detector 75 is a multi-tone detector for simultaneously detecting, for example, more than one frequency. A frequency detected by the in-band control signal detector 75 is programmable, that is, changeable. A detected signal is called a Call Progress Tone or a monitor signal and contains a Ring Tone, a Busy Tone, or a Dial Tone. The Ring Tone is audible while calling another apparatus 2, the Busy Tone is audible while another apparatus 2 is busy, and the Dial Tone is audible while a telephone handset of said apparatus 1 is hooked.

The in-band control signal detector (multi-tone detector) 75 is connected to a frequency setting circuit 76. Based on values set to the frequency setting circuit 76, the frequencies of signals to be detected by the in-band control signal detector 75 can be set to various values. For the reason why in-band control signals may be subject to the laws of a country, the rules of a locality, or the standards, the frequencies of the signals to be detected by the in-band control signal detector 75 are set, as described above, to various programmable values. The values to be set to the frequency setting circuit 76 are provided, through a data input/output buffer 77, by the control unit 80.

Operations of the embodiment are as follows. First it is assumed that the network control unit 30 establishes a telephone link in accordance with the same procedure as in a usual telephone, then the voice message sending unit 60 sends a message, for example, "Enter a password and then press the Enter button (# button)" to another apparatus 2, and then an operator of another apparatus 2 who received the message operates push buttons on another apparatus as indicated. In this case, since the operator of another apparatus 2 may respond to the voice message by pressing the push buttons before the sending of the message is completed, an attempt to detect a DTMF signal from another apparatus 2 with the DTMF signal detector 50 is made while the voice is being sent. The switch 81 is previously turned to the path 82 so that voice output from the voice message sending unit 60 can be inputted to the in-band control signal detector 75 of the MODEM 70. The DTMF signal detector 50, on detecting the DTMF signal, outputs an interrupt signal to the control unit 80 to inform the control unit 80 of the detection of the DTMF signal. The control unit 80, on receiving the said interrupt signal, reads a code corresponding to the DTMF signal detected by the DTMF signal detector 50, for example, one of numbers 1, 2, 3 ... or a symbol such as # from the detector 50.

The controller 80 determines a combination of component frequencies of the DTMF signal detected by the DTMF signal detector 50, based on the code read from the detector 50 and sets frequencies thus obtained to the frequency setting circuit 76 of the MODEM 70. Based on this setting, the in-band control signal detector 75 can determine whether a signal (DTMF noise) of similar frequencies to those of the DTMF signal detected by the DTMF signal detector 50 is being sent, through the switch 81 and the path 82, from the voice message sending unit 60. If the in-band control signal detector 75 detected the DTMF noise, it is considered that the same DTMF noise flows also into the DTMF signal detector 50. That is, it is considered that the DTMF signal detected by the DTMF signal detector 50 is not the DTMF signal from another apparatus 2, but the DTMF noise from the voice message sending unit 60. Therefore, if the in-band control signal detector 75 detected the DTMF noise, the control unit 80 makes a code read from the DTMF signal detector 50 null and void. If the in-band control signal detector 75 did not detect the DTMF noise, the control unit 80 makes a code read from the DTMF signal detector 50 effective. Frequencies are set to the frequency setting circuit 76 each time the DTMF signal detector 50 detects a DTMF signal. This means that all DTMF signals detected by the DTMF signal detector 50 are checked to see if they are DTMF noises from the voice message sending unit 60.

According to the embodiment, whether detected by the DTMF signal detector 50 is a DTMF noise from the voice message sending unit 60 or a DTMF signal transmitted from another apparatus 2 can be determined and malfunction due to the DTMF noise can be avoided by ignoring the noise.

Further, since the embodiment is constructed so that DTMF noises can be detected through the use of the in-band control signal detector 75 previously provided in the MODEM 70, modifications to a conventional construction may be readily made.

Figure 2:
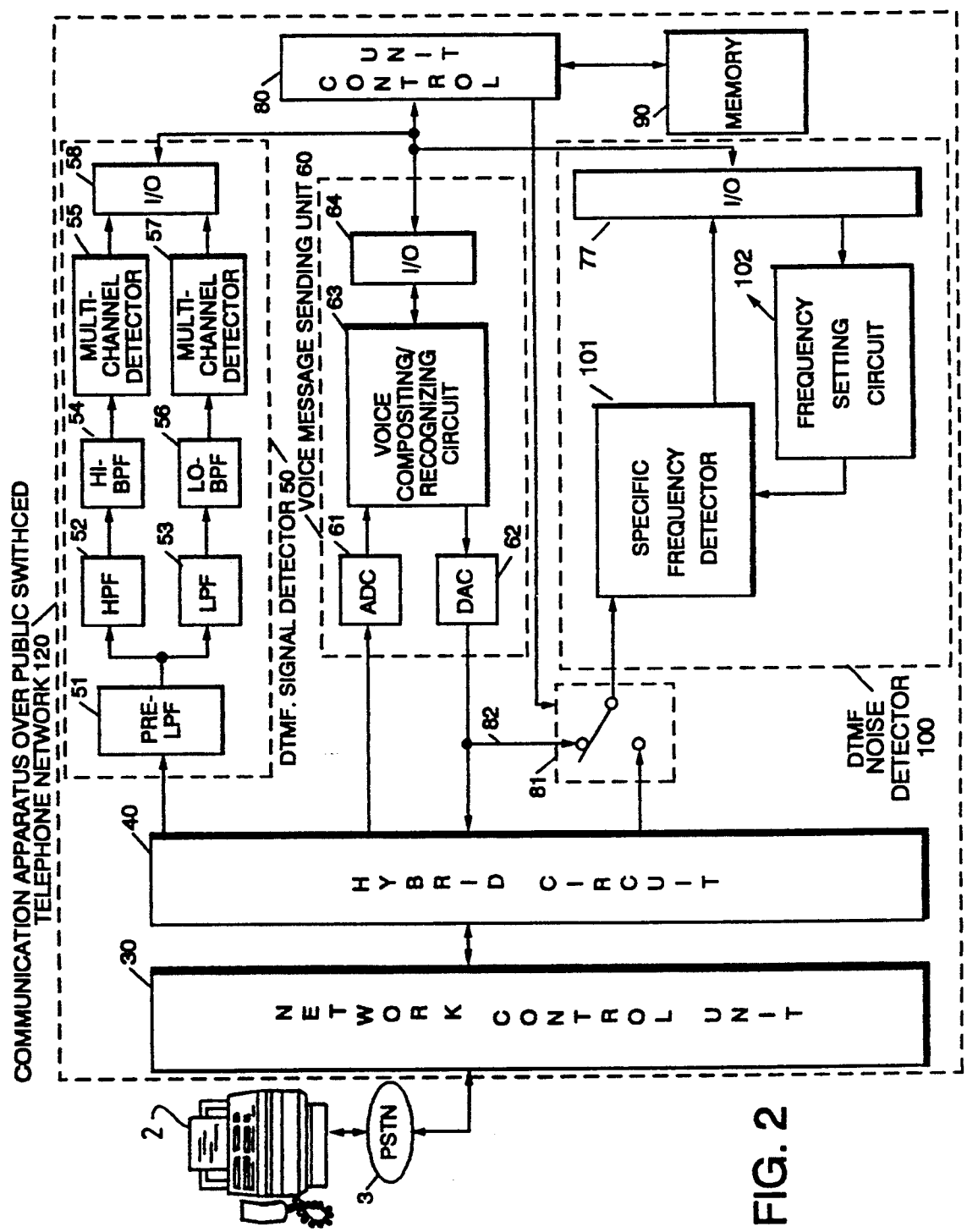
FIG. 2 is a block diagram showing the overall construction of a second embodiment of a communication apparatus over a public switched telephone network according to the present invention.

FIG. 2 shows a second embodiment. In the figure, a communication apparatus 120 for transmitting/receiving information over a public switched telephone network 120 is provided with a dedicated DTMF noise detector 100 for detecting a DTMF noise, instead of the MODEM 70 of the first embodiment. The detector 100 includes a specific frequency detector 101 corresponding to the in-band control signal detector 75 in the MODEM 70 of the first embodiment and a frequency setting circuit 102 for setting a frequency of a signal detected by the specific frequency detector 101 based on a code of a DTMF signal detected by the DTMF detector 50. Also in the second embodiment, whether detected by the DTMF signal detector 50 is a DTMF noise from the voice message sending unit 60 or a DTMF signal transmitted from another apparatus 2 can be determined and thus malfunction due to the DTMF noise can be avoided by ignoring the DTMF noise.

Figure 3:
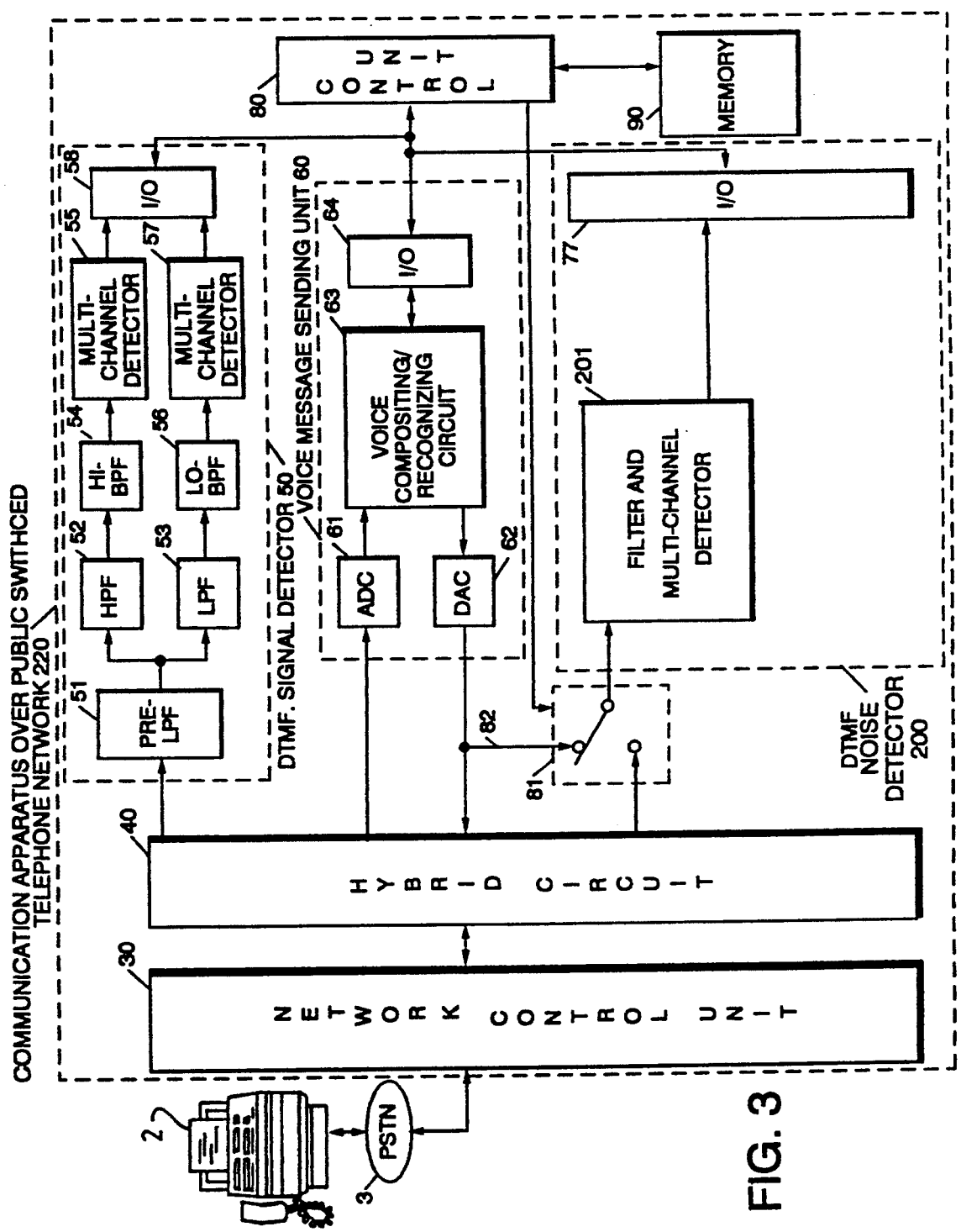
FIG. 3 is a block diagram showing the overall construction of a third embodiment of a communication apparatus over a public switched telephone network according to the present invention.
Figure 4:
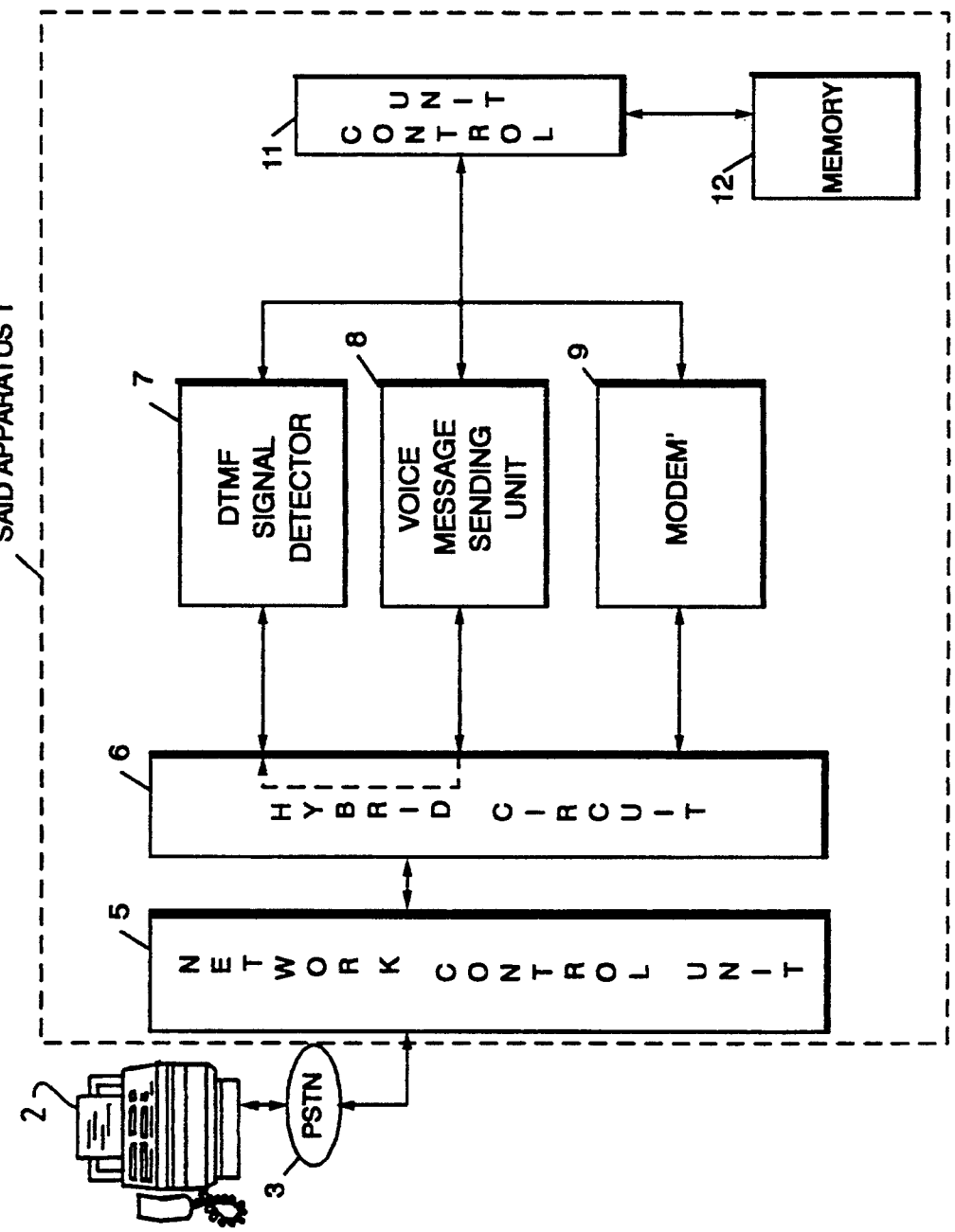
FIG. 4 is a block diagram showing the construction of a conventional communication apparatus over a public switched telephone network.

FIG. 3 shows a third embodiment. In the figure, a DTMF noise detector 200 of a communication apparatus over a public switched telephone network 220 has a construction similar to the DTMF detector 50. That is, a filter and multi-channel detector 201 performs the same function as in the filters 51, 52, 53, 54 and 56, and the detectors 55 and 57 of the DTMF detector 50 to detect all combinations of sixteen frequencies as in DTMF signals detected by the DTMF signal detector 50. Also in the third embodiment, whether detected by the DTMF signal detector 50 is a DTMF noise from the voice message sending unit 60 or a DTMF signal transmitted from another apparatus 2 can be determined and thus malfunction due to the DTMF noise can be avoided by ignoring the DTMF noise.

It will be appreciated that the present invention may be applied not only to said embodiments, but also to other communication apparatus provided with a voice message sending unit and a DTMF signal detector, for example, a telephone with an answering function. It will be appreciated also that a DTMF noise may be caused from any source other than the voice message sending unit.

ADVANTAGES OF THE INVENTION

As described above, according to the present invention, a communication apparatus over a public switched telephone network free from malfunction due to a flow of a DTMF noise signal caused by said apparatus into a DTMF signal detector can be provided.

I claim:

1. A communication apparatus for transmitting/receiving information over a public switched telephone network comprising: a network control unit for establishing channels over the public switched telephone network; a two-wire/four-wire exchange circuit in which the input/output of a two-wire circuit is connected to said network control unit; a DTMF signal detector for detecting a DTMF signal connected to the input/output of a four-wire circuit in said two-wire/four-wire exchange circuit; a voice message sending unit for sending a voice signal connected to the input/output of the four-wire circuit in said two-wire/four-wire exchange circuit; a MODEM for transforming a signal from a form which is compatible with the outside of said apparatus and vice-versa connected to the input/output of the four-wire circuit in said two-wire/four-wire exchange circuit; said modem including an in-band control signal detector for detecting a predetermined frequency generated by the voice message sending unit; and a controller means for setting the predetermined frequency in response to the DTMF signal generated by the DTMF generator.

2. A communication apparatus for connecting to a public switched telephone network comprising: a sending means to transmit messages to the network; a dual tone multi frequency (DTMF) signal detector to detect DTMF signals; a noise detector means to detect noise signals from the sending means and a control means operatively coupled to the noise detector and the signal detector; said control means being responsive to DTMF signals detected by the signal detector to generate and set predetermined frequencies which are being correlated with noise frequencies associated with detected noise signals to void DTMF signals if the predetermined frequencies and the noise frequencies are similar.

3. The communication apparatus according to claim 2, wherein the noise detector means includes a switch coupled to the sending means and a modem coupled to the switch; said modem including an in-band signal detector, and a frequency setting means coupled to said in-band signal detector.

4. The communication apparatus of claim 3 wherein the frequency setting means includes a frequency setting circuit and a buffer connected to the frequency setting circuit.

5. The communication apparatus of claim 2 wherein the noise detector means includes a switch coupled to the sending means; a frequency detector for detecting frequencies within a desired range of frequencies coupled to the switch, and a frequency setting means for setting a selected frequency within the desired range of frequencies connected to the frequency detector.

6. The communication apparatus of claim 5 wherein the selected frequency set by said frequency setting means is based upon a code for a DTMF signal detected by said DTMF signal detector.

7. The communication apparatus of claim 2 wherein the DTMF signal detector and the noise detector means are multi-tone detectors for simultaneously detecting multiple frequencies.

8. The communication apparatus of claim 7 wherein the similar construction includes filtering circuits and multi-channel detectors operatively interconnected to detect all combinations of a desired number of frequencies.

9. The communication apparatus of claim 8 wherein the desired number of frequencies is sixteen.

* * * * *